H. DUFF & H. LE H. SMITH.
HIGH WATER CONTROL FOR MULTIPLE DRUM BOILERS.
APPLICATION FILED AUG. 19, 1913.
1,159,193.
Patented Nov. 2, 1915.
2 SHEETS—SHEET 1.
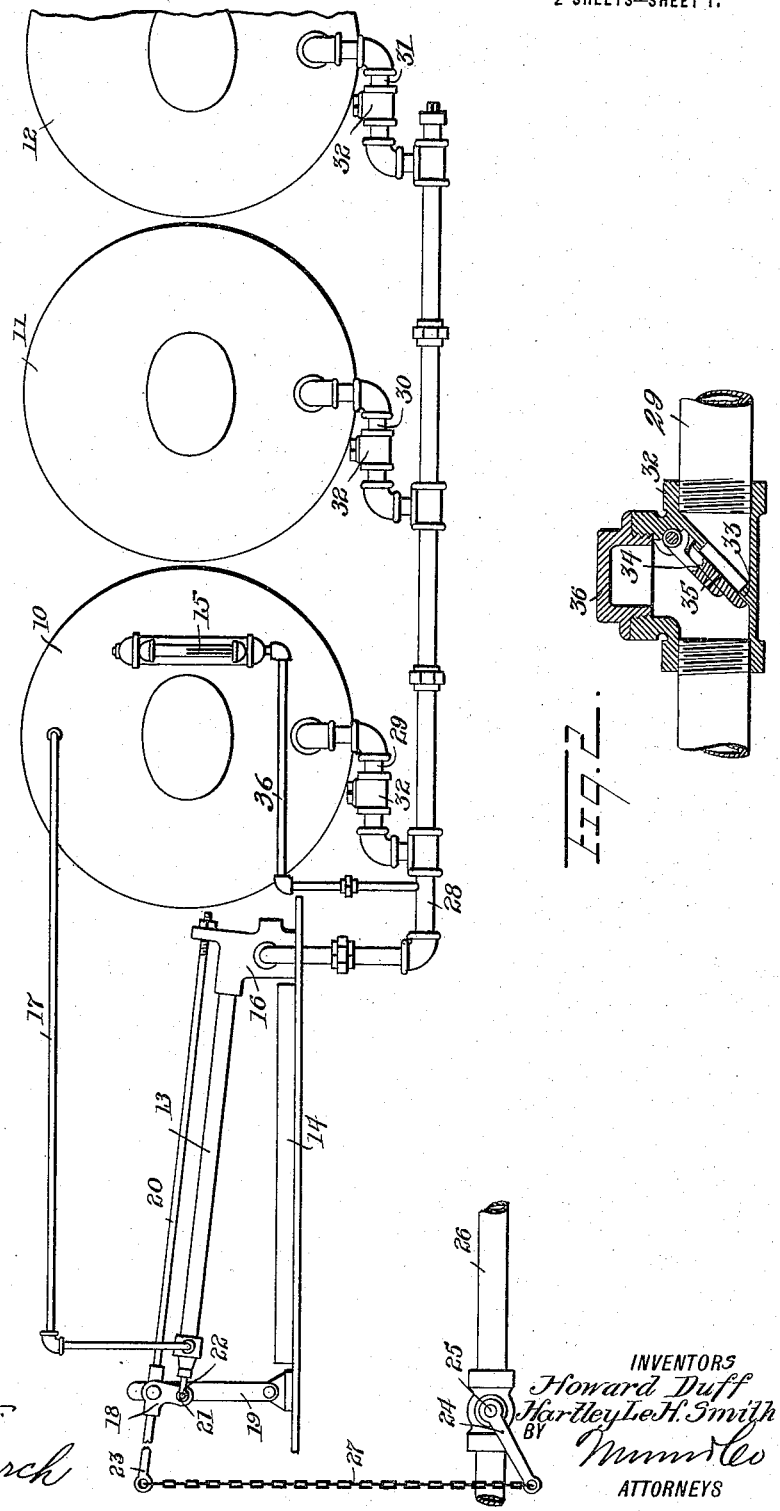

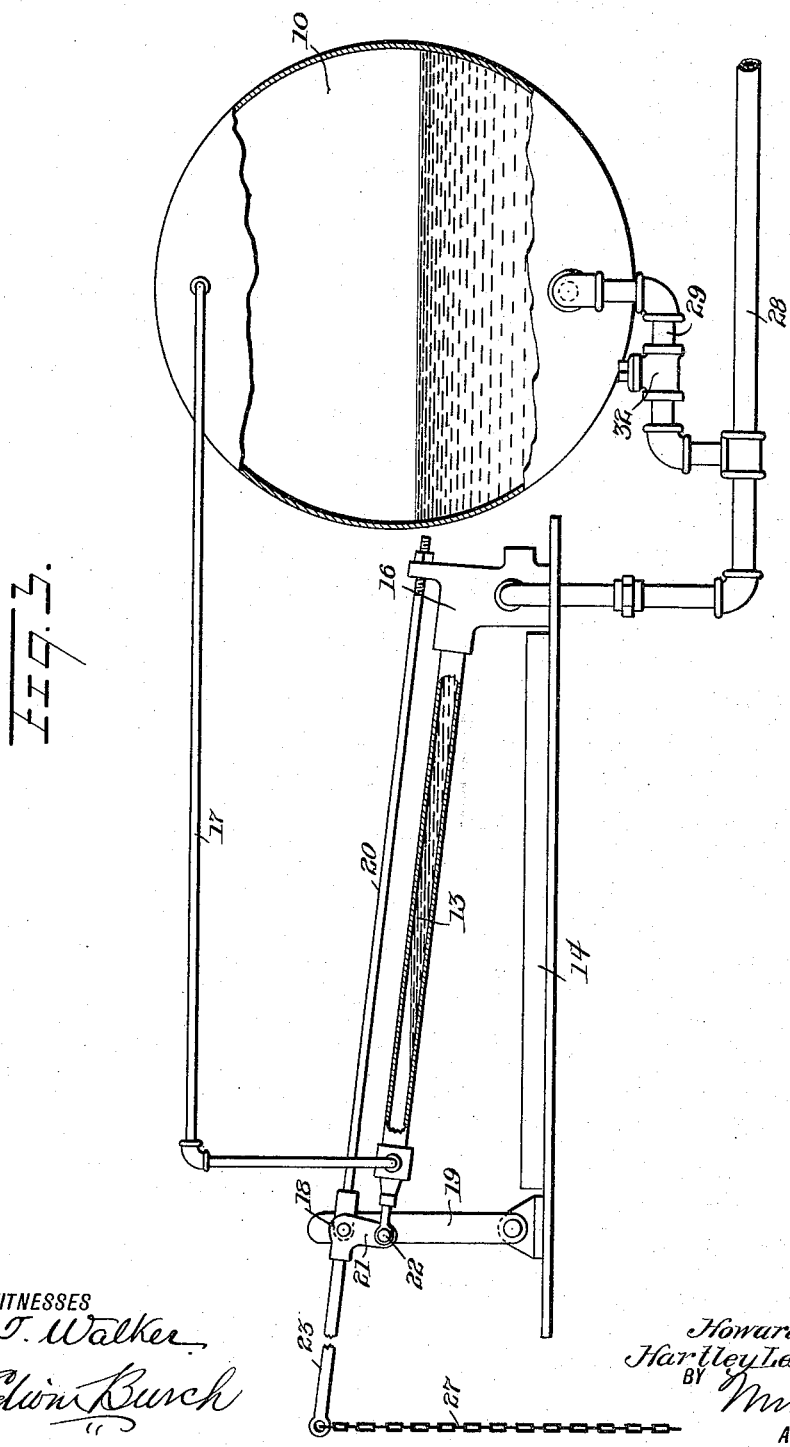

UNITED STATES PATENT OFFICE.

HOWARD DUFF AND HARTLEY LE H. SMITH, OF NEW YORK, N. Y.

HIGH-WATER CONTROL FOR MULTIPLE-DRUM BOILERS.

1,159,193. Specification of Letters Patent. Patented Nov. 2, 1915.

Application filed August 19, 1913. Serial No. 785,553.

*To all whom it may concern:*

Be it known that we, HOWARD DUFF, a subject of the King of Great Britain, and a resident of the city of New York, borough of Brooklyn, in the county of Kings and State of New York, and HARTLEY LE H. SMITH, a citizen of the United States, and a resident of the city of New York, Forest Hills, borough of Queens, in the county of Queens and State of New York, have invented a new and Improved High-Water Control for Multiple-Drum Boilers, of which the following is a full, clear, and exact description.

This invention relates to an improved controlling system for multiple drum boilers, and more particularly to a high water control system adapted for use in connection with a feed water regulator or for general notification of high water with or without automatic regulation of it, both in reference to multiple drum water tube boilers, causing the regulation or the notification to be in accordance with the water level in the drum where the level is highest, the importance of this being the fact that the high water level is of most significance in multiple drum water tube boilers, especially in preventing surging of the water and consequent injury to superheaters, steam pipe lines or machinery.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a front elevation of a plurality of steam drums of a water tube steam boiler, with the improved high water control system connected thereto, in connection with a feed water regulator and main feed water pipe, it being understood that the feed water regulator shown is merely illustrative of the application of this invention in connection with a feed water regulator, and any other feed water regulator might have been shown, or the application of the invention might have been shown in connection with a scheme of general notification of high water in the drum in which the level happens to be highest, with or without any attempt at automatic regulation of the water flow through the feed line; Fig. 2 is an enlarged detail sectional view of one of the check valves employed in the system; and Fig. 3 is a view similar to Fig. 1 showing one of the drums, the drum and the expansion tube of the regulator which happens to have been chosen for illustrative purposes, being shown partly in section, it being understood that some form of regulator not making use of an expansion tube might have been chosen for purposes of illustration.

In high pressure boiler work, of high capacity and water tube design, it is common to use several drums rather than one, and experience shows that there is very considerable difference in water level between the different drums, such difference being irregular in magnitude and location, so that in one drum it is high for one moment and in another, the next. This very often results in a more or less periodic surging of water level which fluctuates between the different drums as the wave of a head of water moves from one drum to another with a time interval determined by the natural period of the boiler component parts as elements of a hydraulic reservoir system.

With feed water regulating and with devices for giving general notification of high water level, as high water alarm systems, it is a common practice to consider the water level of the boiler as determined by the water level in a gage glass or water column attached to one of the several drums of a multiple drum boiler, regardless of where the water may be in the other drums. Thus, when a feed water regulating device is used it is a common practice to so connect it that one of its functions is to preserve this accepted single drum level either as nearly unchanged as possible while the rate of feed water flow varies from zero to a value much beyond any attainable steaming rate, or to make the accepted level above referred to the one preserved at the average rate of feed water flow and then control the flow as an inverse function of the rise or fall above and below this normal or average level. With either of these constructions, however, the water levels in the drums to which the feed water regulator is not connected are continually fluctuating, and these fluctuations do not affect the regulator, and therefore have no effect upon the feed water flow.

The same may be said of systems of mere general notification of high water level with or without regulation of feed water flow; the notification is given only when high water occurs in the drum to which the device is connected, and high water in any of the several remaining drums of the multiple drum boiler may do damage unhindered.

It is the main object of the invention herein being described to overcome the above mentioned defects and control the feed water flow or give general notification, as the case may be, in accordance with the high water level in whichever one of the several drums may happen at any moment to have the highest level.

It is a not uncommon practice to connect feed water regulators to the mud drum or some other part of the boiler in which a free surface separating water and steam does not exist, instead of connecting the regulator to a water column or gage glass or in any other way, directly or indirectly, to any one steam drum of a multiple drum boiler. When this is done the feed water regulator is acted upon by a head of water which varies as the average head in all the multiple steam drums, and thereby causes the rate of feed water flow to be determined by the average water level in all the steam drums. This is not generally satisfactory because, as stated before, the water levels in the different steam drums fluctuate and in any one of them the water level may be so much higher than the average water level in all of them as to cause surging of water from that drum over into the superheaters, or directly to the steam lines, and so be the cause of damage. It is thus apparent that the highest water level is of much the greatest importance in multiple drum water tube boiler practice for the purpose of automatic regulation of the feed water flow or for general notification of high water. The surges of water result in carrying the same over into the steam lines in boilers with or without superheaters and the water so carried over, commonly called water slugs, occasions trouble and damage to superheaters, steam pipe lines, engines or turbines, and this trouble and damage will be entirely avoided where a feed water regulator is caused to be acted upon by and respond to the water level in that drum in which the water level happens at any moment to be highest, this level shifting about in an irregular but often more or less periodic manner from one drum to another. For accomplishing these functions, that is, for causing the feed water regulator to be affected by and thereby exercise control in accordance with the water level in the drum where the level chances to be highest among the various and varying water levels of a multiple drum boiler, or for causing general notification to be given of undesirable high water level, we have illustrated an embodiment in the accompanying drawings.

Referring to the drawings, the numerals 10, 11 and 12 designate a plurality of steam drums of a multiple drum water tube boiler, and the numeral 13 designates an expansion tube of a feed water boiler of the submerged tube type, which is mounted on a support 14 and which is disposed in an inclined position, as shown. The tube 13 is mounted in a hollow casting 16 at its lower end, and this end is on a common level with the lowest point of a water gage.

The highest point of the expansion tube is at an elevation corresponding to the normal or safe level of the water in any of the drums, and this upper end of the tube of the regulator is connected to the steam space of the drum 10, or of any other one of the steam drums carrying the level gage, by means of piping indicated by the numeral 17. The upper end of the tube is also connected to an angular or bell crank lever 18 which is mounted upon a pivoted support 19, which support is connected to the casting 16 through the instrumentality of an adjusting rod 20 to compensate for the movement of the parts. The lever is provided with a depending arm 21 which is in turn pivotally connected with the tube, as shown at 22, and the inclined or longer arm of the lever, indicated by the numeral 23, has connection with the actuating arm 24 of a valve 25 controlling the supply of water to the boiler through a main feed water pipe 26, as by means of a flexible connection or chain 27. This valve 25 is disposed in a normally closed position and is maintained in this position when the water level is high and the water enters the expansion tube so that the latter is contracted and permits the arm 23 to be lowered and the arm 24 to close the valve 25. However, when the water level becomes low and is displaced by steam through the pipe 17, the tube 13 will expand and rock the lever 18 on its pivot, and this will result in the raising of the arm 23 and the arm 24 through the connection 27 to open the valve 25 and supply water to the boiler.

As before mentioned, it is common to connect the lower end of the expansion tube communicating with the interior of the casting 16 with the water space of the drum or to the mud drum of the boiler, and if connected to only one of the steam drums it is evident that the water level in the other two drums can have no influence on the regulator, and if connected to the mud drum, the water in each steam drum, equally or nearly so, controls the water level in the expansion tube, and the result is that the water in the tube stands at or near the average of the levels of the water in the three drums and the high levels are not provided against.

By the herein described invention, the feed water regulator is caused to be acted upon by and respond to the highest water level in any drum for the purposes specified, and for this purpose all of the drums of the multiple drum boiler are connected to the regulator independently or through a system of pipes forming a manifold 28 which preferably communicates with the casting 16. The lower end of the water gage is connected by a conduit 36 to the manifold 28; while the upper end of the gage is connected to the steam space of any of the drums; as shown, it is connected to the drum 10. The manifold is in turn connected with the drums through the instrumentality of branch connections 29, 30 and 31, each carrying a valve casing 32 having a seat 33 with which a valve in the form of a pivoted flap 34 coöperates, to produce a check valve opening in one direction only to freely permit the flow of water from the drums to the manifold. Each flap is further provided with a restricted opening 35 through which a minute quantity or volume of water may flow under increased pressure from the expansion tube through the manifold to the drums. Each valve casing 32 is preferably provided with a removable plug or cap 36 to permit access to the valve for any desired purpose. If the openings 35 were not provided the system would not operate, for the simple reason that the water would not be able to flow from the regulator to the drums when it stood at a higher level in the regulator than in the drums, so that by providing the small holes through the flaps of the check valves this defect is overcome and the water in the feed water regulator will always stand at a slightly lower level than the water in the drum at the highest level, owing to the fact that there will be a constant, though slight, flow of water from this drum to the other two drums through these small openings in the check valves. The difference between the level of the water in the drum having the highest level and that in the feed water regulator or device for general notification of high water corresponds to the lost head resulting from the flow of water to the other drums, and this depends upon the size of the holes in the flaps of the check valves, but in a practical way can be kept down to as low a level as is necessary or desirable, such, for instance, as one inch.

Owing to the connections of the feed water regulator with the different drums, a hydraulic gradient is established from each drum to the regulator, and these gradients are sometimes positive and at other times negative, water flowing in all cases in accordance with the hydraulic gradient existing at that moment. This is due to the fact that all the pipes are open at all times to water flow, and the important feature of the invention resides in the fact that the pipes are open, but by reason of providing the openings through the check valves the hydraulic gradient is caused to be always less steep when the water flows from one drum to the water manifold, than is the case when the water flows to the same drum through the manifold from the other drums. By the hydraulic gradient being less steep when the water flows from any drum, that is, in the positive direction, than when it flows to the drum, that is, in the negative direction, is meant the fact that by the nature of the device constituting this invention a given flow of water in the positive direction will require a lesser hydraulic head to produce it than the same flow of water in a negative direction; or when on any two occasions the hydraulic heads available in the manifold or in the feed water regulator or in a general notification device and in any of the drums are equal but in opposite directions, then in the positive direction a greater flow of water will be produced than in the negative direction. This is due to the fact that the flaps fall open in the positive direction and the resistance is less than that offered in the negative direction, when the valves will seat and the water must pass through the openings 35.

Thus, the device constituting this invention causes the hydraulic resistance of the pipe lines, or other connecting passages from the respective drums to the feed water regulator or from the respective drums to the manifold, if a manifold is used, to automatically vary, upon reversal of the flow of the water, giving low hydraulic resistance to the flow of the water in the positive direction, and higher hydraulic resistance to the flow of the water in the negative direction. The mechanical means by which the above described essential feature of this invention is accomplished consists of the check valves as described, and the ratio of the area of each hole in a valve to the area of each check through which the hole extends is small, the magnitude depending upon the number of drums in the multiple drum boiler. The following general relations hold concerning the ratio of the holes to the area of the checks:—

Let $n$ = number of drums in multiple drum boiler.

$A$ = area of check.

$a$ = area of hole extending through check.

$$na < A \text{ or } \frac{a}{A} < \frac{1}{n}$$

In the system of general notification of undesirable or dangerously high water level, with or without automatic regulation of the feeding of the water, the gage glass 15 is connected to the manifold 28, as shown at 36, and the gage glass constitutes a signal, which might be a visual or audible one, operated upon by the highest water level. Without automatic regulation of the feed water, through automatic actuation of the valve 25, the regulator is omitted and the operation of the valve left to the attendant to be operated upon the notification being given of the dangerously high water level or actuation of the signal of which the gage glass is one of many forms that might be employed.

Having thus described our invention, what we claim as new and desire to secure by Letters Patent is:—

1. A high water control for multiple drum boilers, embodying the combination with a multiple of drums and a feed water regulator connected at its upper end with the steam space of a drum; of connectionos between all of the drums and the lower end of the water regulator, and means located in said connections whereby the flow of water from the drums to the regulator is under less resistance than the flow in the opposite direction.

2. A water control for multiple drum boilers, embodying the combination with a multiple of drums and a manifold connecting the drums; of means associated with the manifold and with the steam space of a drum to operate and be affected by the water level and steam pressure in the drum in which the water level is highest, and means located between said manifold and each drum, whereby the flow of water in the direction of the first-mentioned means is under less resistance than the flow in the opposite direction.

3. In combination, a plurality of steam drums of a boiler, a manifold connecting all of said drums, a feed-water regulator connected to said manifold and to the steam space of any one of the drums, a water gage also connected to the manifold and to the steam space of any one of the drums, and means positioned between each drum and the manifold which afford a free flow from the drum to the manifold but a restricted flow in the opposite direction.

4. In combination, a plurality of boiler drums, a manifold connected to the said drums, a valve between each drum and manifold for offering a higher resistance to flow from the manifold to the drum than from the drum to the manifold, and means adapted to be affected by the steam pressure in one of the drums and connected to the manifold to be affected by the hydraulic head therein.

5. In combination with a plurality of boiler drums, a manifold connecting all of said drums, a check valve from each of the drums to the manifold having an opening affording a restricted flow from the manifold to the drum but a free flow from the drum to the manifold, and means connected to the steam space of any one of the drums and to the manifold so as to be affected by the hydraulic head therein.

6. In combination with a plurality of boiler drums, a manifold connecting all of said drums, a check valve from each of the drums to the manifold, each of said check valves having an opening affording a restricted flow from the manifold to the drum and a free flow from the drum to the manifold, the sum total of the cross-sectional areas of the openings in all the check valves being less than the cross-sectional area of any of the check valves, and means connected to the steam space of any one of the drums to be affected by the steam pressure thereof and also connected to the manifold to be affected by the hydraulic head in the manifold, substantially as and for the purpose set forth.

7. In combination with a plurality of steam drums of a boiler, a manifold connecting all of said drums, a check valve from each of the drums to the manifold, each of said check valves having an opening affording a restricted flow from the manifold to the drum while leaving an undisturbed flow from the drum to the manifold, a feed-water regulator connected to the manifold and to the steam space of any one of the drums, a water gage connected to the steam space of any one of the drums and to the manifold, the sum total of the cross-sectional area of the openings in all the check valves being less than the cross-sectional area of any one of the check valves, substantially as and for the purpose set forth.

In testimony whereof we have signed our names to this specification in the presence of two subscribing witnesses.

HOWARD DUFF.
HARTLEY LE H. SMITH.

Witnesses:
E. A. MARSCHALK,
J. H. DEERE.

Copies of this patent may be obtained for five cents each, by addressing the "Commissioner of Patents, Washington, D. C."